United States Patent
Birnie et al.

(10) Patent No.: US 10,228,744 B2
(45) Date of Patent: Mar. 12, 2019

(54) METHOD AND APPARATUS FOR DETECTING AND MANAGING OVERCURRENT EVENTS

(71) Applicants: Andrew Edward Birnie, Bearsden (GB); Robert Moran, Largs (GB); Philippe Mounier, Tournefeuille (FR); Alistair Paul Robertson, Glasgow (GB)

(72) Inventors: Andrew Edward Birnie, Bearsden (GB); Robert Moran, Largs (GB); Philippe Mounier, Tournefeuille (FR); Alistair Paul Robertson, Glasgow (GB)

(73) Assignee: NXP USA, Inc., Austin, TX (US)

(*) Notice: Subject to any disclaimer, the term of this patent is extended or adjusted under 35 U.S.C. 154(b) by 346 days.

(21) Appl. No.: 15/027,742

(22) PCT Filed: Oct. 18, 2013

(86) PCT No.: PCT/IB2013/002717
§ 371 (c)(1),
(2) Date: Apr. 7, 2016

(87) PCT Pub. No.: WO2015/056043
PCT Pub. Date: Apr. 23, 2015

(65) Prior Publication Data
US 2016/0231799 A1 Aug. 11, 2016

(51) Int. Cl.
*G06F 1/32* (2006.01)
*G06F 1/28* (2006.01)

(52) U.S. Cl.
CPC .............. *G06F 1/3206* (2013.01); *G06F 1/28* (2013.01); *G06F 1/3243* (2013.01)

(58) Field of Classification Search
CPC ......... G06F 1/3206; G06F 1/3243; G06F 1/28
See application file for complete search history.

(56) References Cited

U.S. PATENT DOCUMENTS

| 6,574,739 B1 | 6/2003 | Kung et al. |
| 8,233,256 B2 | 7/2012 | Mehas et al. |
| 2002/0050806 A1* | 5/2002 | Fujiwara ............... H02J 7/0031 320/136 |

(Continued)

FOREIGN PATENT DOCUMENTS

WO 2013048447 A1 4/2013

OTHER PUBLICATIONS

International Search Report, Application No. PCT/IB2013/002717, dated Jun. 25, 2014, 11 pages.

(Continued)

*Primary Examiner* — Scott Bauer

(57) ABSTRACT

A method of detecting overcurrent events within at least one electronic device, and an overcurrent detection module therefor. The method comprises receiving at least one current requirement indication from at least one electronic device, determining at least one overcurrent value based at least partly on the received at least one current requirement indication, receiving at least one indication of at least one input current flow for the at least one electronic device, and determining that an overcurrent event is occurring if the indicated at least one input current flow for the at least one electronic device exceeds the determined at least one overcurrent value.

17 Claims, 5 Drawing Sheets

(56) References Cited

U.S. PATENT DOCUMENTS

| | | | |
|---|---|---|---|
| 2003/0121981 A1* | 7/2003 | Slutsky | G06K 7/10851 235/462.45 |
| 2008/0249666 A1 | 10/2008 | Buterbaugh et al. | |
| 2012/0032645 A1* | 2/2012 | Matsuura | H02J 7/0031 320/134 |
| 2012/0293902 A1 | 11/2012 | Huang et al. | |
| 2013/0132758 A1 | 5/2013 | Shiba | |

OTHER PUBLICATIONS

Vinnakota, Bapiraju, "Monitoring Plower Dissipation for Fault Detection," IEEE Conference, Proceedings of 14th VLSI Test Symposium, 6 pages.

Van Lammeren, Joop, "IccQ: a Test Method for Analogue VESI Based on Current monitoring," IEEE International Workshop on IDDQ Testing, 1997, 5 pages.

Calin et al,, "Upset-tolerant CMOS SRAM using current monitoring: prototype and test experiments," Proceedings of 1995 IEEE International Test Conference, 9 pages.

Su et al., "Testing of Static Random Access Memories by Monitoring Dynamic Power Supply Current," Journal of Electronic Testings: Theory and Applications, 1992, 2 pages.

Walker et al., "An Approach for Detecting Bridging Fault-induced Delay Faults in static CMOS circuits using dynamic power supply current monitoring," IEEE International Workshop on IDDQ Testing, 1997, 5 pages.

Eckersall et al., "Testing Mixed Signal ASICs Through the Use of Supply Current Monitoring," Proceedings ETC 93 Third European Test Conference, 1993, 7 pages.

Benini et al., "Monitoring System Activity for OS-directed Dynamic Power Management," 1998 International Symposium on Low Power Electronics and Design, 1998, 6 pages.

\* cited by examiner

METHOD AND APPARATUS FOR DETECTING AND MANAGING OVERCURRENT EVENTS

FIELD OF THE INVENTION

This invention relates to a method and apparatus for detecting and managing overcurrent events.

BACKGROUND OF THE INVENTION

Functional safety is a critical requirement in many modern applications. In the automotive industry, functional safety is defined within the ISO 26262 Functional Safety Standard, which is an adaptation of the industrially broader Functional Safety Standard IEC 61508 for Automotive Electric/Electronic Systems.

Power management is a key area of functional safety within the automotive industry, as well as within electrical/electronic industries more generally. Overcurrent, or excess current, is a situation where a larger than intended electric current exists through a conductor, leading to excessive generation of heat, and the risk of fire or damage to equipment. Possible causes for overcurrent include short circuits, excessive load, and incorrect design. Current limiters are commonly used protection mechanisms to control the risks of overcurrent. Conventional current limiters comprise a static/fixed maximum current limit whereby current flow is prevented from exceeding the static/fixed maximum current limit.

However, in many modern applications, and in particular automotive applications, microcontroller units (MCUs) have complex power modes, so an MCU will often be running at a reduced current level well below a maximum required current level. As a result, when the MCU is running at such a reduced current level, faults or other error conditions may be occurring and causing extra current flow, but which would not be detected by a conventional, static overcurrent mechanism because the overall current flow may still be below the static/fixed maximum current limit.

SUMMARY OF THE INVENTION

The present invention provides a method of detecting overcurrent events within at least one electronic device, a method of overcurrent event management, an overcurrent detection module arranged to detect overcurrent events within at least one electronic device overcurrent event management module and an overcurrent event management module as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
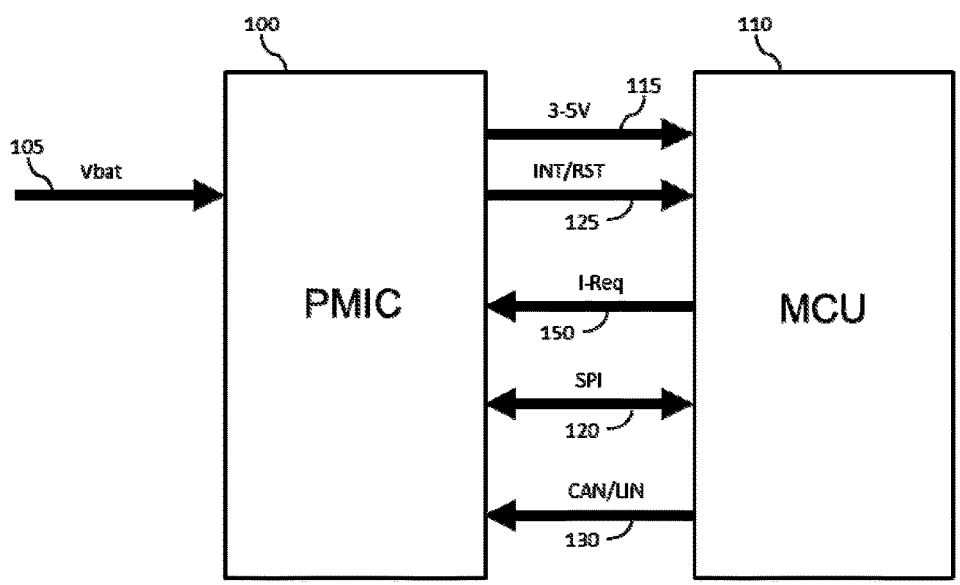
FIG. 1 illustrates a simplified block diagram of an example of a power management integrated circuit (PMIC) device.

Examples of the present invention will now be described with reference to the accompanying drawings. However, it will be appreciated that the present invention is not limited to the specific examples herein described and illustrated in the accompanying drawings, and various modifications and variations are contemplated. For example, the present invention is herein described with reference to a power management integrated circuit (PMIC) device arranged to detect and manage overcurrent events within a microcontroller unit (MCU). However, it is contemplated that the present invention is not limited to being implemented within such a PMIC device, and may equally be implemented within any other type integrated circuit device, or even within a standalone overcurrent detection and management device. Furthermore, it will be appreciated that the present invention is not limited to the detection and management of overcurrent events within an MCU device, and may equally be applied to the detection and management of overcurrent events within alternative electronic devices.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In accordance with some examples of a first aspect of the invention, there is provided a method of detecting overcurrent events within at least one electronic device. The method comprises receiving at least one current requirement indication from at least one electronic device, determining at least one overcurrent value based at least partly on the received at least one current requirement indication, receiving at least one indication of at least one input current flow for the at least one electronic device, and determining that an overcurrent event is occurring if the indicated at least one input current flow for the at least one electronic device exceeds the determined at least one overcurrent value.

In this manner, an appropriate overcurrent value may be dynamically determined based on an indicated current requirement for the (client) electronic device. In particular, the method is not restricted to a static/fixed maximum current limit for detecting an overcurrent event, and is provided with the ability to dynamically configure an overcurrent value based on a received current requirement indication that allows the overcurrent value to be dynamically adjusted depending on a prescribed current requirement of the client electronic device at that point in time. As a result, when the client electronic device is running at a reduced required current level, faults or other error conditions occurring and causing extra current flow may be detected, even if the overall current flow is below a maximum required current level.

In some examples, the method may further comprise configuring at least one overcurrent comparison signal based at least partly on the determined at least one overcurrent value, comparing the received at least one indication of the at least one input current flow to the at least one overcurrent comparison signal, and determining that an overcurrent event is occurring if the at least one indication of the at least one input current flow exceeds the at least one overcurrent comparison signal.

In some examples, the method may further comprise determining the at least one overcurrent value further in accordance with preconfigured overcurrent configuration parameters.

In some examples, the method may further comprise receiving the at least one current requirement indication, retrieving at least one preconfigured overcurrent configuration parameter corresponding to the at least one current requirement indication, and determining the at least one overcurrent value based at least partly on the at least one retrieved preconfigured overcurrent configuration parameter.

In some examples, the method may further comprise receiving at least one current requirement indication from the at least one electronic device, retrieving at least one preconfigured overcurrent configuration parameter corresponding to the at least one current requirement indication, determining the at least one overcurrent value based at least partly on the at least one retrieved preconfigured overcurrent configuration parameter, determining whether an indicated current requirement comprises a timing limit based at least partly on the at least one retrieved preconfigured overcurrent configuration parameter, and configuring the at least one overcurrent comparison signal based at least partly on the determined at least one overcurrent value for a preconfigured time limit, if it is determined that the indicated current requirement comprises a timing limit.

In some examples, the method may further comprise receiving at least one current requirement indication from the at least one electronic device comprising at least one of:
  an indication of a required current supply for the at least one electronic device;
  an indication of an operating mode for the at least one electronic device;
  an indication of at least one process executing on the at least one electronic device; and
  an indication of at least one address access by a process executing on the at least one electronic device.

In accordance with some examples of a second aspect of the invention, there is provided a method of overcurrent event management. The method comprises detecting an overcurrent event within at least one integrated circuit, IC, device in accordance with the first aspect of the invention, and setting a non-maskable interrupt signal for the at least one electronic device.

In some examples, the method may further comprise, upon setting the non-maskable interrupt signal: initiating a cycle counter; determining whether an overcurrent event is detected after N cycles; and setting a reset signal for the at least one electronic device, if it is determined that an overcurrent event is detected after N cycles.

In some examples, the method may further comprise, upon setting a reset signal for the at least one electronic device: initiating a cycle counter; determining whether an overcurrent event is detected after M cycles; and initiating a forced powering down of the at least one electronic device, if it is determined that an overcurrent event is detected after M cycles.

In some examples, the method may further comprise incrementing a destructive reset count upon determining that an overcurrent event is detected after M cycles and initiating a forced power down of the at least one electronic device.

In accordance with some examples of a third aspect of the invention, there is provided an overcurrent detection module arranged to detect overcurrent events within at least one electronic device. The overcurrent detection module is arranged to receive at least one current requirement indication from at least one electronic device, determine at least one overcurrent value based at least partly on the received at least one current requirement indication, receive at least one indication of at least one input current flow for the at least one electronic device, and generate an overcurrent event detected signal if the indicated at least one input current flow for the at least one electronic device exceeds the determined at least one overcurrent value.

In some examples, the overcurrent detection module may be arranged to determine the at least one overcurrent value in accordance with preconfigured overcurrent configuration parameters.

In some examples, the overcurrent detection module may be arranged to receive the at least one current requirement indication, retrieve at least one preconfigured overcurrent configuration parameter corresponding to the at least one current requirement indication from at least one configurable memory element, and determine the at least one overcurrent value based at least partly on the at least one retrieved preconfigured overcurrent configuration parameter.

In some examples, the overcurrent detection module may be arranged to receive at least one current requirement indication from the at least one electronic device, retrieve at least one preconfigured overcurrent configuration parameter corresponding to the at least one current requirement indication, determine the at least one overcurrent value based at least partly on the at least one retrieved preconfigured overcurrent configuration parameter, determine whether an indicated current requirement comprises a timing limit based at least partly on the at least one retrieved preconfigured overcurrent configuration parameter, and configure the at least one overcurrent comparison signal based at least partly on the determined at least one overcurrent value for a preconfigured time limit, if it is determined that the indicated current requirement comprises a timing limit.

In some examples, the overcurrent detection module may be arranged to receive at least one current requirement indication from the at least one electronic device comprising at least one of:
  an indication of a required input current flow for the at least one electronic device;
  an indication of an operating mode for the at least one electronic device;
  an indication of at least one process executing on the at least one electronic device; and
  an indication of at least one address range access by a process executing on the at least one electronic device.

In accordance with some examples of a fourth aspect of the invention, there is provided an overcurrent event management module arranged to receive an overcurrent event detected signal generated by at least one overcurrent detection module of the third aspect of the invention, and to set a non-maskable interrupt signal for the at least one electronic device upon receipt of an overcurrent event detected signal.

In some examples, the overcurrent event management module may be further arranged to, upon setting the non-maskable interrupt signal initiate a cycle counter, determine whether the overcurrent event detected signal is set after N cycles, and set a reset signal for the at least one electronic device, if it is determined that the overcurrent event detected signal is set after N cycles.

In some examples, the overcurrent event management module may be further arranged to, upon setting the reset signal for the at least one electronic device: initiate a cycle counter; determine whether the overcurrent event detected signal is set after M cycles; and initiating a forced powering down of the at least one electronic device, if it is determined that the overcurrent event detected signal is set after M cycles.

In some examples, the overcurrent event management module may be further arranged to increment a destructive reset count upon determining that the overcurrent event detected signal is set after M cycles and initiating a forced power down of the at least one electronic device.

In accordance with some examples of a fifth aspect of the invention, there is provided an integrated circuit (IC) device comprising at least one overcurrent detection module according to the third aspect of the invention.

In some examples, the IC device may further comprise at least one overcurrent event management module according to the fourth aspect of the invention Referring first to FIG. 1, there is illustrated a simplified block diagram of an example of a power management integrated circuit (PMIC) device 100. PMIC devices are integrated circuit devices (or a system block in a system-on-a-chip device) for managing power requirements of a host system. A PMIC is often included in battery operated devices such as mobile phones and portable media players, as well as other applications such as automotive applications.

PMIC devices that combine several functions such as, for example, a combination of Low Drop Out (LDO) voltage regulators, switching voltage regulators, high side switches, physical layer transceivers (e.g. CAN, LIN, PSI5), that are often used in MCU-based systems and the like, are typically referred to as System Basis Chips (SBCs). SBCs often possess various power saving modes such as standby, sleep and stop and other features such as wakeup, watchdog timer, etc.

The PMIC device 100 in the illustrated example is arranged to receive a power supply signal 105 from, say, a battery (not shown) and comprises one or more voltage regulators (not shown) for outputting voltage and/or current supply signals, such as the voltage supply signal 115 illustrated in FIG. 1, to one or more further IC devices such as the microcontroller unit (MCU) 110 illustrated in FIG. 1. An interface may be provided between the PMIC device 100 and a host system to enable the PMIC device to be configured/controlled. In the illustrated example, a Serial Peripheral Interface (SPI) bus 120 is provided between the PMIC device 100 and the MCU 110 for such purposes. Various other connections/signals may be provided between the PMIC device 100 and the MCU 110, such as one or more interrupt/reset signals 125, one or more network connections 130, etc. For example, in automotive applications, such network connections may comprise a CAN (Controller Area Network) connection and/or a LIN (Local Interconnect Network) connection.

As previously identified, functional safety is a critical requirement in many modern applications, with power management being a key area of functional safety within the automotive industry, as well as within electrical/electronic industries more generally. Overcurrent events, where a larger than intended electric current exists through a conductor, can lead to excessive generation of heat, and the risk of fire or damage to equipment. Furthermore, overcurrent events often indicate incorrect or unexpected operation of the MCU 110.

In accordance with examples of the present invention, the PMIC device 100 is arranged to receive one or more current requirement indications from, say, one or more (client) electronic devices to which the PMIC device 100 outputs one or more voltage and/or current supply signals. In the illustrated example, the PMIC 100 receives a current requirement indication 150 from the MCU 110. The PMIC device 100 is further arranged to determine at least one overcurrent value based at least partly on the received current requirement indication(s), and to detect an overcurrent event if an input current flow for, in the illustrated example, the MCU 110 exceeds the determined overcurrent value.

In this manner, the PMIC device 100 is able to dynamically determine an appropriate overcurrent value based on an indicated current requirement for, in the illustrated example, the MCU 110. In particular, the PMIC device 100 is not restricted to a static/fixed maximum current limit for detecting an overcurrent event, and is provided with the ability to dynamically configure an overcurrent value based on a received current requirement indication that allows the overcurrent value to be dynamically adjusted depending on a prescribed current requirement of the client electronic device (i.e. the MCU 110 in the example illustrated in FIG. 1) at that point in time. As a result, when the client electronic device is running at a reduced required current level, faults or other error conditions occurring and causing extra current flow may be detected, even if the overall current flow is below a maximum required current level.

Figure 2:
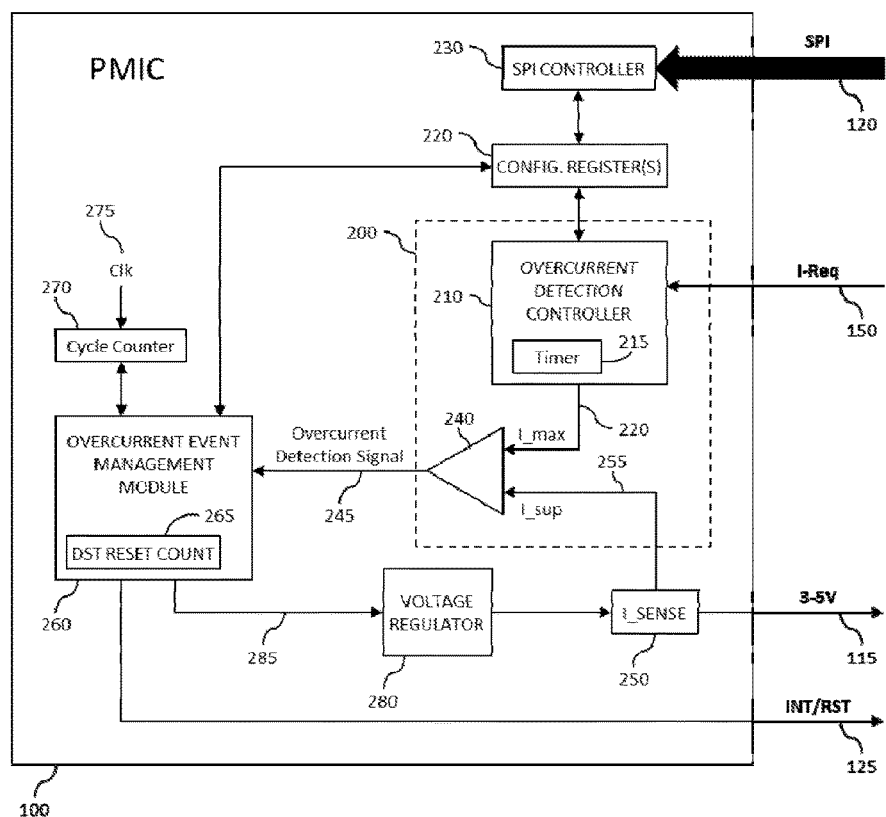
FIG. 2 illustrates a simplified block diagram of an example of a part of the PMIC device of FIG. 1 comprising an overcurrent detection module and an overcurrent event management module.

Referring now to FIG. 2, there is illustrated a simplified block diagram of an example of a part of the PMIC device 100 of FIG. 1. The PMIC device 100 comprises at least one overcurrent detection module 200. The overcurrent detection module 200 in the example illustrated in FIG. 2 comprises an overcurrent detection controller component 210 arranged to receive the current requirement indication 150 and determine an overcurrent value based at least partly on the received current requirement indication 150.

In some examples, the overcurrent detection controller component 210 may be arranged to derive the overcurrent value substantially directly from the received current requirement indication. For example, the MCU 110 may use the current requirement indication 150 to directly indicate a (maximum) required current supply. As such, the overcurrent detection controller component 210 may set the overcurrent value to equal a value of the received current requirement indication 150.

In some alternative examples, the overcurrent detection controller component 210 may be arranged to determine the overcurrent value further based on one or more preconfigured overcurrent configuration parameters. Such preconfigured overcurrent configuration parameters may be stored within one or more configurable memory elements, such as the configurable register(s) 220 illustrated in FIG. 2. In the illustrated example, the overcurrent configuration parameters may be configured by way of the SPI bus 120, whereby an SPI controller 230 may be arranged to receive overcurrent configuration commands over the SPI bus 120 comprising the overcurrent configuration parameters, and to write the overcurrent configuration parameters to the configurable register(s) 220.

The overcurrent detection controller component 210 may be arranged to receive the current requirement indication 150, retrieve one or more preconfigured overcurrent configuration parameter(s) corresponding to the current requirement indication from the register(s) 220, and to determine the overcurrent value based on the retrieved preconfigured overcurrent configuration parameter(s).

In some examples, the current requirement indication 150 may be arranged to comprise an address pointer for the configurable register(s) 220, and the overcurrent detection controller component 210 may be arranged to retrieve one or more overcurrent configuration parameter(s) from an address within the configurable register(s) 220 corresponding to the received current requirement indication 150, and derive an overcurrent value based on the retrieved parameters.

In some alternative examples, the current requirement indication may comprise an indication of, say, one or more operating condition(s) of the MCU 110, such as an operating mode of the MCU 110, a process identifier of a process being executed, an address value or address range being accessed by a process being executed, etc. Overcurrent configuration parameters for different operating conditions may be preconfigured within the configurable register(s) 220. In this manner, upon receipt of a current requirement indication 150 comprising one or more such operating condition(s), the overcurrent detection controller component 210 may be arranged to retrieve one or more overcurrent configuration parameters from the register(s) 220 associated with the operating condition(s) corresponding to the current requirement indication 150. For example, the overcurrent configuration parameters may be configured within one or more lookup tables stored within the register(s) 220, and the MCU 110 may use the current requirement indication 150 to directly indicate one or more operating condition(s) therefor. As such, upon receipt of the current requirement indication 150 indicating one or more operating condition(s) of the MCU 110, the overcurrent detection controller component 210 may retrieve one or more overcurrent configuration parameters from the lookup table(s) stored within the register(s) 220 corresponding to the indicated operating condition(s) of the MCU 110. The overcurrent detection controller component 210 may then derive the overcurrent value based on the retrieved parameter(s).

In the example illustrated in FIG. 2, having determined an overcurrent value based on the received current requirement signal 150 and/or one or more overcurrent configuration parameter(s) retrieved from the configurable register(s) 220, the overcurrent detection controller component 210 is arranged to configure an overcurrent comparison signal 220 based on the determined overcurrent value. The overcurrent detection module 200 illustrated in FIG. 2 comprises a comparator component 240 arranged to receive the overcurrent comparison signal 220. The comparator component 240 is further arranged to receive an input current flow indication signal 255 providing an indication of the input current flow to the MCU 110, for example provided by way of a current sense component 250. The comparator component 240 is arranged to compare the received input current flow indication signal 255 to the overcurrent comparison signal 220, and to output an overcurrent detection signal 245 based on the comparison of the received input current flow indication signal 255 to the overcurrent comparison signal 220. In particular, the comparator component 240 is arranged to set the overcurrent detection signal 245 to comprise an overcurrent event detected signal if the indicated input current flow exceeds the overcurrent comparison signal 220. Thus, the comparator component 240 is arranged to set the overcurrent detection signal 245 to comprise an overcurrent event detected signal upon detection of an overcurrent event as inferred by the indicated input current flow exceeding the overcurrent comparison signal 220.

In some examples, the overcurrent detection controller component 210 may further be arranged to determine whether an indicated current requirement comprises a timing limit. For example, it is contemplated that certain operating conditions of the MCU 110 may require a certain, increased current supply for a limited period of time, following which the current supply is expected to return to, say, a reduced previous current flow. Accordingly, in some examples the overcurrent configuration parameters preconfigured within the register(s) 220 may comprise information relating to such timing limits. For example, and as illustrated in Table 1 below, one or more lookup tables may be stored within the configurable register(s) 220 comprising a time limit flag for each operating condition indicating for which operating conditions a current supply is required for a limited period of time, and an indication of the duration of such a period of time.

TABLE 1

| Operating Condition | Max Current | Time Limit Flag | Duration |
|---|---|---|---|
| e.g. Process_ID, Address range, Power mode, etc. | e.g. N milliamps | Y/N | e.g. M milliseconds |
| ... | ... | ... | ... |

Accordingly, if the overcurrent detection controller component 210 determines that an indicated current requirement comprises a timing limit (e.g. based on parameters within a lookup table stored in the register(s) 220), the overcurrent detection controller component 210 may configure the overcurrent comparison signal according to the required (time limited) current supply, and initiate a timer 215 in accordance with a required duration as defined by the retrieved parameters. Upon expiry of the timer 215, the overcurrent detection controller component 210 may reconfigure the overcurrent comparison signal back to the previous overcurrent value.

Thus, as described above, the PMIC device 100, and in particular in the illustrated example the overcurrent detection module j, is able to dynamically determine an appropriate overcurrent value based on an indicated current requirement for, in the illustrated example, the MCU 110, and thereby to detect overcurrent events in accordance with the dynamically determined overcurrent value.

In the example illustrated in FIG. 2, the PMIC device 100 further comprises an overcurrent event management module 260 arranged to receive the overcurrent event detection signal 245 generated by the overcurrent detection module 200. In some examples, upon an overcurrent event being detected by the overcurrent detection module 200, and thus upon the overcurrent event detection signal 245 being set to comprise an overcurrent event detected signal, the overcurrent event management module 260 is arranged to set a non-maskable interrupt (NMI) signal for the MCU 110, for example via the one or more interrupt/reset signals 125. In this manner, the MCU 110 may be informed that an overcurrent event has been detected therefor, enabling the MCU 110 to take appropriate actions to correct the faults or other error conditions that may be occurring and causing the extra (unwanted) current flow.

In some examples, the overcurrent event management module 260 may further be arranged, upon setting the non-maskable interrupt signal, to initiate a cycle counter, such as the cycle counter illustrated at 270 in FIG. 2. The cycle counter 270 may be arranged to 'count' cycles of, say, a clock signal 275, or any other suitable cyclic signal. The overcurrent event management module 260 may further be arranged to determine whether the detected overcurrent event is still present, for example by virtue of the overcurrent event detected signal 245 still being set, after N cycles. If the overcurrent event management module 260 determines that the detected overcurrent event is still present, then the event management module 260 may be arranged to set an MCU reset signal, for example via the one or more interrupt/reset signals 125, to initiate a 'soft' reset of the MCU 110.

In some examples, the overcurrent event management module 260 may further be arranged, upon setting the reset signal, to initiate the cycle counter 270 and to determine whether the detected overcurrent event is still present after a further M cycles. If the overcurrent event management module 260 determines that the detected overcurrent event is still present, then the event management module 260 may be arranged to initiate a forced powering down of the MCU 110 to initiate a 'hard' reset of the MCU 110. For example, the overcurrent event management module 260 may be arranged to cause (either directly or indirectly) a voltage regulator 280 supplying power to the MCU 110 to cease providing a voltage supply to the MCU 110 via a power control signal 285. In some examples, the overcurrent event management module 260 may further be arranged to increment a destructive reset count 265 upon determining that an overcurrent event is still present/detected after M cycles and initiating a force power down or the MCU 110. In this manner, if the MCU 110 is repeatedly being forcefully powered down it may be assumed that a serious problem exists and the MCU 110 can be permanently power down, or restricted to a safe/reduced functionality mode of operation.

In the examples hereinbefore described, the overcurrent event management module 260 enables the PMIC device 100 to manage detected overcurrent events within the MCU 110 is a progressive manner by implementing a multi-stage approach to rectifying overcurrent events.

The ability of the PMIC device 100 to detect overcurrent events in accordance with a dynamically determined overcurrent value in combination with the progressive overcurrent event management significantly improves the ability of the PMIC device 100 to protect against overcurrent events caused by faults and error conditions such as, by way of example:
fault conditions caused by hardware defects;
code runaway conditions;
internal latch-up or electrical overstress conditions;
erroneous code, especially self-modifying Trojan horse style code;
etc.

Figure 3:
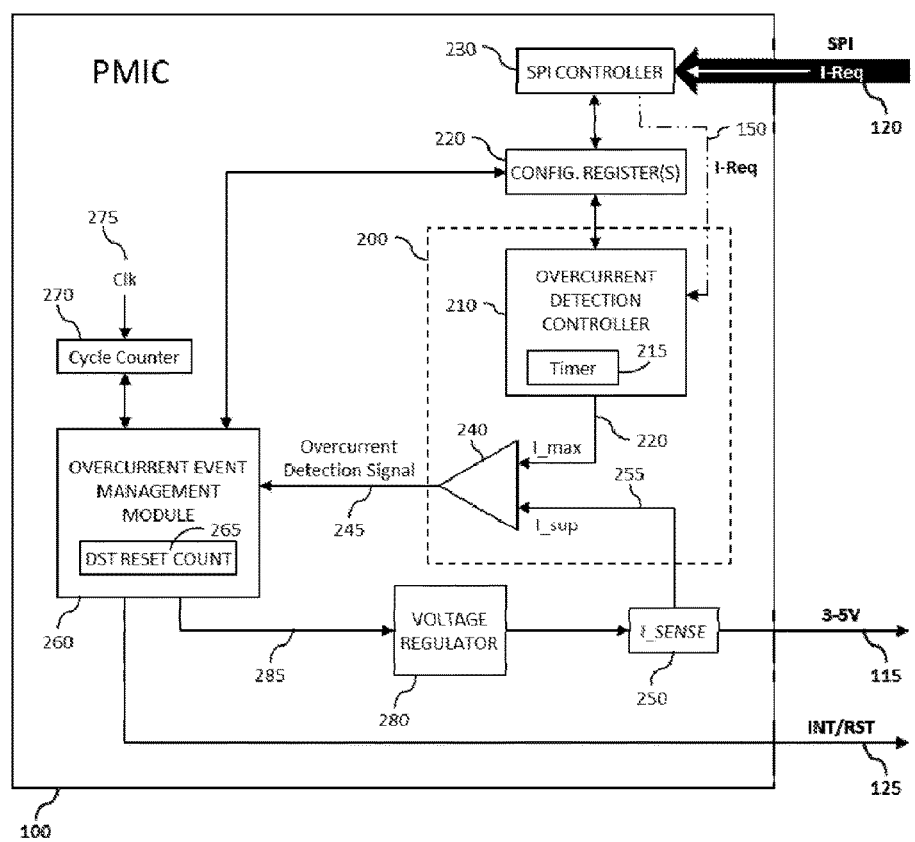
FIG. 3 illustrates a simplified block diagram of an alternative example of a part of the PMIC device of FIG. 1 comprising an overcurrent detection module and an overcurrent event management module.

In the examples illustrated in FIGS. 1 and 2, a dedicated physical current requirement indication signal 150 has been illustrated and described between the MCU 110 and the PMIC device 100 for clarity and ease of understanding. However, it will be appreciated that the present invention is not limited to such a dedicated physical current requirement indication signal 150, and it is contemplated that any communication mechanism between the PMIC device 100 and, in the illustrated examples, MCU 110 may equally be used for conveying the current requirement indication signal 150 there between. For example, and as illustrated in FIG. 3, the current requirement indication signal may be implemented using the SPI bus 120 whereby the MCU 110 may transmit the current requirement indication signal via the SPI bus, and the SPI controller 230 within the PMIC device 100 may be arranged to provide the received current requirement indication signal 150 to the overcurrent detection controller 210, as illustrated in FIG. 3. Alternatively, the SPI controller 230 may be arranged to simply write the current requirement indication signal to the configurable register(s) 220, from where they may be retrieved by the overcurrent detection controller 210. For example, the overcurrent detection controller 210 may be arranged to periodically poll the configuration register(s) 220 for the current requirement indication signal 150.

Figure 4:
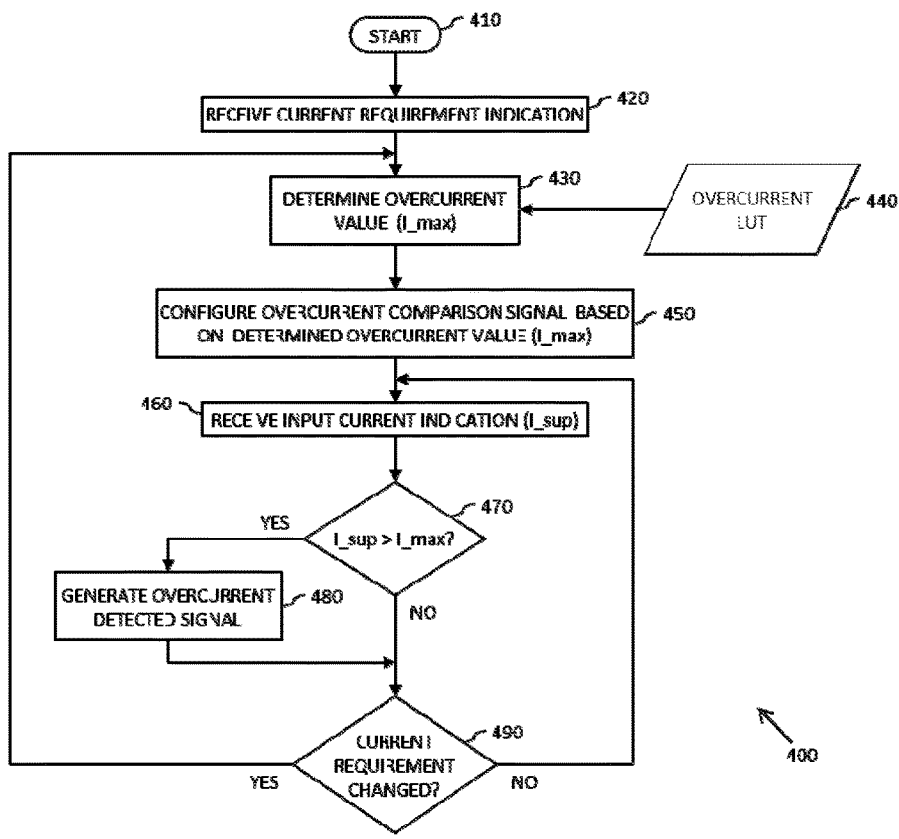
FIG. 4 illustrates a simplified flowchart of an example of a method of detecting overcurrent events within one or more electronic devices.

Referring now to FIG. 4, there is illustrated a simplified flowchart 400 of an example of a method of detecting overcurrent events within one or more (client) electronic devices, such as may be implemented within the PMIC device 100 of FIG. 1, for example by way of the overcurrent detection module 200 illustrated in FIGS. 2 and 3.

The method starts at 410, and moves on to 420 where a current requirement indication is received from a client electronic device, such as the MCU 110 illustrated in FIG. 1. Next, at 430, an overcurrent value is determined based at least partly on the received current requirement indication. In the illustrated example, the method comprises determining the overcurrent value in accordance with preconfigured overcurrent configuration parameters which are retrieved from one or more lookup tables 440, such as may be stored within one or more memory elements such as the configurable register(s) 220 illustrated in FIGS. 2 and 3. An overcurrent comparison signal is the configured based at least partly on the determined overcurrent value at 450.

An indication of an input current for the client electronic device (e.g. MCU 110) is received, at 460, and compared to the overcurrent comparison signal, at 470. If the indication of the input current flow for the client electronic device exceeds the overcurrent comparison signal, an overcurrent detected signal is generated, at 480.

The method then moves on to 490 where it is determined whether a current requirement for the client electronic device has changed, for example as a result of a new/different current requirement indication being received. Additionally/alternatively, a current requirement change may occur upon expiry of a timing limit for a latest current requirement. If a current requirement change has occurred, the method loops back to 430 where a new overcurrent value for the new current requirement is determined. Conversely, if no current requirement change has occurred, the method loops back to 460 and the method continues to compare an input current indication for the client electronic device being monitored to the overcurrent comparison signal corresponding to the latest current requirement.

Figure 5:
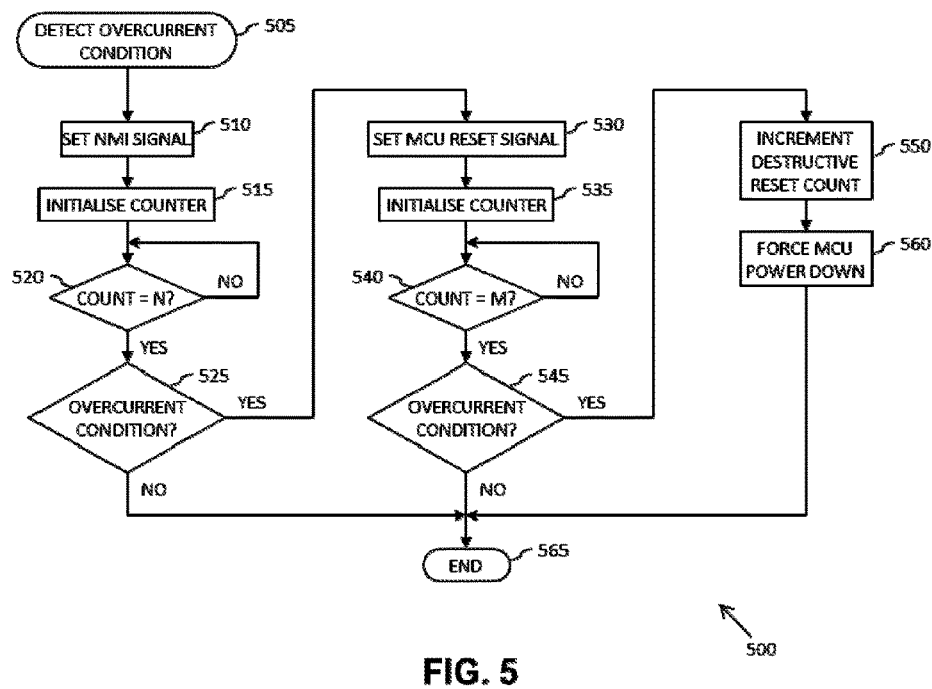
FIG. 5 illustrates a simplified flowchart of an example of a method of overcurrent event management.

Referring now to FIG. 5, there is illustrated a simplified flowchart 500 of an example of a method of overcurrent event management, such as may be implemented within the PMIC device 100 of FIG. 1, for example by way of the overcurrent event management module 260 illustrated in FIGS. 2 and 3.

The method starts at 505 with the detection of an overcurrent condition within a client electronic device (e.g. the MCU 110), for example by way of an overcurrent detected signal being generated in accordance with the method illustrated in FIG. 4. Upon detection of an overcurrent condition, the method moves on to 510 where a non-maskable interrupt signal is set for the client electronic device. Next, at 515, a cycle counter is initialised (e.g. set to 0) and upon the cycle counter counting N cycles of, for example, a clock signal at 520 the method moves on to 525 where it is determined whether an overcurrent condition is still detected (e.g. whether the overcurrent detected signal is still being generated). If it is determined that the overcurrent condition is no longer detected, it may be assumed that the client electronic device has correct the fault/problem in response to the non-maskable interrupt, and the method ends at 565.

Conversely, if it is determined that the overcurrent condition is still detected, the method in the illustrated example moves on to 530, where a reset signal for the client device is set. Next, at 535 the cycle counter is again initialised and upon the cycle counter counting M cycles of, for example a clock signal at 540 (where M may or may not equal N) the method moves on to 425 where it is determine whether an overcurrent condition is still detected. If it is determined that the overcurrent condition is no longer detected, it may be assumed that the client electronic device has successfully reset itself resulting in the fault/problem being corrected, and the method ends at 565.

Conversely, if it is determined that the overcurrent condition is still detected, the method in the illustrated example moves on to 550 where in the illustrated example a destructive reset count value is incremented. A forced power down of the client electronic device is then initiated at 560, and the method ends at 565.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the examples illustrated in FIGS. 2 and 3, the overcurrent detection module 200 and the overcurrent event management module 260 have been illustrated as separate logical components for clarity and ease of understanding. However, it will be appreciated that such an overcurrent detection module 200 and overcurrent event management module 260 may, for example, equally be implemented as a single functional block.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the overcurrent detection module 200 and the overcurrent event management module 260 may be implemented as circuitry located on a single integrated circuit within the PMIC device 100 of the illustrated example. Alternatively, the examples may be implemented as any number of separate integrated circuits or separate devices interconnected with each other in a suitable manner. For example, the overcurrent detection module 200 and the overcurrent event management module 260 may equally be implemented as separate integrated circuits or separated devices within multiple PMIC devices or PMIC components.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of detecting overcurrent events within at least one electronic device; the method comprising:
   receiving at least one current requirement indication from at least one electronic device;
   determining at least one overcurrent value based at least partly on the received at least one current requirement indication;
   receiving at least one indication of at least one input current flow for the at least one electronic device;
   determining that an overcurrent event is occurring if the indicated at least one input current flow for the at least one electronic device exceeds the determined at least one overcurrent value; and
   after setting an interrupt signal:
      initiating a cycle counter;
      determining whether an overcurrent event is detected after N cycles; and
      setting a reset signal for the at least one electronic device, if it is determined that an overcurrent event is detected after N cycles.

2. The method of claim 1, wherein the method comprises configuring at least one overcurrent comparison signal based at least partly on the determined at least one overcurrent value;
   comparing the received at least one indication of the at least one input current flow to the at least one overcurrent comparison signal; and
   determining that an overcurrent event is occurring if the at least one indication of the at least one input current flow exceeds the at least one overcurrent comparison signal.

3. The method of claim 1, wherein the method comprises determining the at least one overcurrent value further in accordance with preconfigured overcurrent configuration parameters.

4. The method of claim 1, wherein the method further comprises:

retrieving at least one preconfigured overcurrent configuration parameter corresponding to the at least one current requirement indication; and
determining the at least one overcurrent value based at least partly on the at least one retrieved preconfigured overcurrent configuration parameter.

5. The method of claim 4, wherein the method further comprises:
   determining whether an indicated current requirement comprises a timing limit based at least partly on the at least one retrieved preconfigured overcurrent configuration parameter; and
   configuring the at least one overcurrent comparison signal based at least partly on the determined at least one overcurrent value for a preconfigured time limit, if it is determined that the indicated current requirement comprises a timing limit.

6. The method of claim 1, wherein the method comprises receiving at least one current requirement indication from the at least one electronic device comprising at least one of:
   an indication of a required current supply for the at least one electronic device;
   an indication of an operating mode for the at least one electronic device;
   an indication of at least one process executing on the at least one electronic device; and
   an indication of at least one address range access by a process executing on the at least one electronic device.

7. The method of claim 1, wherein the interrupt signal is a non-maskable interrupt signal.

8. The method of claim 1, wherein the method further comprises, upon setting a reset signal for the at least one electronic device:
   initiating a cycle counter;
   determining whether an overcurrent event is detected after M cycles; and
   initiating a forced powering down of the at least one electronic device, if it is determined that an overcurrent event is detected after M cycles.

9. The method of claim 8, wherein the method further comprises incrementing a destructive reset count upon determining that an overcurrent event is detected after M cycles and initiating a forced power down of the at least one electronic device.

10. An overcurrent detection module arranged to detect overcurrent events within at least one electronic device: the overcurrent detection module being arranged to:
   receive at least one current requirement indication from at least one electronic device; determine at least one overcurrent value based at least partly on the received at least one current requirement indication;
   receive at least one indication of at least one input current flow for the at least one electronic device; and
   generate an overcurrent event detected signal if the indicated at least one input current flow for the at least one electronic device exceeds the determined at least one overcurrent value, wherein the overcurrent event management module is further arranged to, upon setting a reset signal for the at least one electronic device:
   initiate a cycle counter;
   determine whether the overcurrent event detected signal is set after M cycles; and
   initiate a forced powering down of the at least one electronic device, if it is determined that the overcurrent event detected signal is set after M cycles.

11. The overcurrent detection module of claim 10, wherein the overcurrent detection module is arranged to determine the at least one overcurrent value in accordance with preconfigured overcurrent configuration parameters.

12. The overcurrent detection module of claim 10, wherein the overcurrent detection module is further arranged to:
   retrieve at least one preconfigured overcurrent configuration parameter corresponding to the at least one current requirement indication from at least one configurable memory element; and
   determine the at least one overcurrent value based at least partly on the at least one retrieved preconfigured overcurrent configuration parameter.

13. The overcurrent detection module of claim 12, wherein the overcurrent detection module is further arranged to:
   determine whether an indicated current requirement comprises a timing limit based at least partly on the at least one retrieved preconfigured overcurrent configuration parameter; and
   configure the at least one overcurrent comparison signal based at least partly on the determined at least one overcurrent value for a preconfigured time limit, if it is determined that the indicated current requirement comprises a timing limit.

14. The overcurrent detection module of claim 13, wherein the overcurrent detection module is arranged to receive at least one current requirement indication from the at least one electronic device comprising at least one of:
   an indication of a required input current flow for the at least one electronic device;
   an indication of an operating mode for the at least one electronic device;
   an indication of at least one process executing on the at least one electronic device; and
   an indication of at least one address range access by a process executing on the at least one electronic device.

15. The overcurrent detection module of claim 13, wherein the overcurrent detection module is arranged to provide the overcurrent event detected signal to an overcurrent event management module, and the overcurrent event management module is configured to set a non-maskable interrupt signal for the at least one electronic device upon receipt of an overcurrent event detected signal.

16. The overcurrent detection module of claim 15, wherein the overcurrent event management module is further arranged to, upon setting the non-maskable interrupt signal:
   initiate a cycle counter;
   determine whether the overcurrent event detected signal is set after N cycles; and
   set the reset signal for the at least one electronic device, if it is determined that the overcurrent event detected signal is set after N cycles.

17. The overcurrent detection module of claim 16, wherein the overcurrent event management module is further arranged to increment a destructive reset count upon determining that the overcurrent event detected signal is set after M cycles and initiating a forced power down of the at least one electronic device.

* * * * *